United States Patent [19]

Dever et al.

[11] Patent Number: 5,723,549
[45] Date of Patent: Mar. 3, 1998

[54] PROCESS FOR THE PREPARATION OF BROMINATED POLYSTYRENE HAVING IMPROVED COLOR CHARACTERISTICS

[75] Inventors: James L. Dever, Medina; James C. Gill, Macedonia, both of Ohio

[73] Assignee: Ferro Corporation, Cleveland, Ohio

[21] Appl. No.: 663,657

[22] Filed: Jun. 14, 1996

[51] Int. Cl.$^6$ ........................................................ C08F 8/18
[52] U.S. Cl. ........................................................ 525/333.4
[58] Field of Search ........................................... 525/333.4

[56] References Cited

U.S. PATENT DOCUMENTS

| | | | |
|---|---|---|---|
| 3,050,476 | 8/1962 | Tress et al. | 260/2.5 |
| 3,474,067 | 10/1969 | Praetzel et al. | 260/41 |
| 3,845,146 | 10/1974 | Moore et al. | 260/650 |
| 3,975,354 | 8/1976 | Buxbaum et al. | 260/40 |
| 4,074,033 | 2/1978 | Wolinski et al. | 526/47 |
| 4,107,231 | 8/1978 | Wurmb et al. | 260/873 |
| 4,137,212 | 1/1979 | Theysohn et al. | 260/37 |
| 4,143,221 | 3/1979 | Naarmann et al. | 526/44 |
| 4,151,223 | 4/1979 | Neuberg et al. | 260/873 |
| 4,200,702 | 4/1980 | Gausepohl et al. | 525/72 |
| 4,200,703 | 4/1980 | Diebel et al. | 525/357 |
| 4,352,909 | 10/1982 | Barda et al. | 525/157 |
| 4,849,134 | 7/1989 | Georlette et al. | 252/601 |
| 4,965,021 | 10/1990 | Georlette et al. | 252/609 |
| 5,112,897 | 5/1992 | Dever et al. | 524/412 |
| 5,112,898 | 5/1992 | Dever et al. | 524/412 |

FOREIGN PATENT DOCUMENTS

| | | |
|---|---|---|
| 0 201 411 | 4/1986 | European Pat. Off. . |
| 1570395 | 11/1969 | Germany . |
| 364873 | 2/1932 | United Kingdom . |

OTHER PUBLICATIONS

The Properties of Nuclear Brominated Styrenes I—The Synthesis and Polymerization of Dibromostyrene and Tribromostyrene, pp. 479–487 by R.C.P. Cubbon and J.D.B. Smith.

*Primary Examiner*—Edward J. Cain
*Attorney, Agent, or Firm*—Renner, Kenner, Greive, Bobak, Taylor & Weber

[57] ABSTRACT

In a process for the preparation of brominated polystyrene, as an additive for polymer matrices to impart flame retardancy, including preparing a solution of a polystyrene reactant comprising from about five to about 20 percent by weight of a polystyrene reactant, in a halogenated hydrocarbon solvent; adding a Lewis acid bromination catalyst to form a solution; adding to the solution from about 1 to about 3.3 moles of a brominating agent, per mole of polystyrene repeating units, and reacting the polystyrene reactant with the brominating agent at a reaction temperature of from about −20° C. to about 50° C.; wherein the improvement comprises controlling the color characteristics of the resultant brominated polystyrene by selecting a polystyrene reactant having a weight average molecular weight of from about 500 to about 1,500,000; selecting a catalytically effective amount of the catalyst on the basis of having a strength sufficient to effect at least monobromination of the polystyrene without inducing alkylation of the polystyrene by the halogenated hydrocarbon solvent; selecting a brominating agent from the group consisting of bromine chloride and bromine; operating at the lowest possible temperature within the range, consistent with the brominating agent and the catalyst selected; and isolating the brominated polystyrene, wherein the color properties of the resultant brominated product are improved by selection and consideration of reaction time and temperature, catalyst, brominating agent and method of product isolation.

10 Claims, No Drawings

PROCESS FOR THE PREPARATION OF BROMINATED POLYSTYRENE HAVING IMPROVED COLOR CHARACTERISTICS

TECHNICAL FIELD

This invention generally relates to a brominated polystyrene having improved color characteristics. More particularly, the invention relates to a process for the bromination of polystyrene with a unique combination of brominating agent, catalyst, reaction time, isolation procedure and temperature controls, such that the resulting brominated polystyrene has improved color characteristics.

BACKGROUND OF THE INVENTION

It is known in the art that brominated polystyrene imparts flame retardant properties to polymers. For example, the use of polybrominated polystyrenes as flame retardant additives for polyolefin-based molding materials is described in U.S. Pat. No. 3,474,067. That patent describes combinations of molding materials based on polyethylene and polypropylene with several different nuclear-brominated polystyrenes together with synergists such as antimony trioxide. The use of poly-(tribromostyrene) was particularly emphasized, as in Table 1 of the patent. However, the patent does not disclose the molecular weight of the brominated polystyrene, nor how it was produced.

U.S. Pat. No. 3,975,354 describes a flame-resistant thermoplastic glass fiber reinforced polyester molding composition, containing a saturated polyester, a synergist and from 3 percent to 30 percent by weight of the composition of poly(2,4,6-tribromostyrene). The patent reported that the poly(2,4,6-tribromo styrene) was a commercially available product with a density of 2.3 grams/cm$^3$ and a bromine content of 69 percent. The process for making the product is not described in this patent.

The direct nuclear halogenation of polystyrene in solution, in the presence of iron chloride or aluminum chloride, with elemental chlorine, is described in British Pat. No. 364,873.

The direct bromination of polystyrene is described in U.S. Pat. No. 3,050,476. A suspension of polystyrene particles is heated in the presence of bromine, to cause bromine to combine chemically with the polymer particles. Bromine is added to a very low level of bromination.

U.S. Pat. No. 3,845,146 describes the bromination of aromatic compounds such as lower alkyl benzenes, utilizing bromine chloride as the brominating agent, with a catalyst such as aluminum chloride. The reaction is conducted in a closed reaction vessel under autogenous pressure, often in the range from about 50 psig to 100 psig.

Cubbon and Smith describe the synthesis and polymerization of tribromostyrene in an article in Polymer, 10, 479–487 (1969). Tribromostyrene is prepared in a multiple step reaction, by first effecting the addition of hydrogen bromide to the double bond of styrene to produce 2-bromoethylbenzene, then reacting that material with elemental bromine in the presence of iron chloride, to introduce bromine into the nucleus. Hydrogen bromide is then removed, to re-introduce the double bond, by reaction with potassium ethoxide, at about 30° C. The product was identified through its nuclear magnetic resonance spectrum as 2,4,5-tribromostyrene. The rate of polymerization of this tribrominated styrene was observed in benzene solution at 30° C. Upon comparing its rate of polymerization with that of dibromostyrene, the conclusion was reached that the introduction of bromine atoms activates the vinyl group toward polymerization, with the tribromostyrene polymerizing at a more rapid rate than the dibromostyrene, which in turn polymerizes at a more rapid rate than styrene.

In German Pat. No. 1,570,395, Example 2 purports to describe the production of poly-(2,4,6-tribromostyrene), and Example 4 purports to describe the production of, simply, poly-(tribromostyrene).

Several other patents have issued that describe the production and flame retardant use of brominated polystyrene oligomers. These oligomers may be prepared by the action of elemental bromine on the hydrogenated polystyrene oligomer, as in the Naarmann et al. U.S. Pat. Nos. 4,074,033 and 4,143,221, where the catalyst used was aluminum chloride (a Lewis acid catalyst), or alternatively, by the polymerization of brominated styrene.

In U.S. Pat. No. 4,107,231, such brominated oligomers are described as useful in imparting flame retardant properties to linear polyesters. The degree of polymerization of the oligomer may be in the range from 3 to 20. The use of a tribrominated oligomer is mentioned.

In U.S. Pat. No. 4,137,212, similar brominated polystyrene oligomers, with a degree of polymerization of from 3 to 90, are disclosed as useful for flameproofing molded nylon compositions. The tribrominated oligomer is mentioned.

In U.S. Pat. No. 4,151,223, the brominated oligomer may have a degree of polymerization in the range from 3 to about 100, and is described as useful for imparting flame-retardant properties to fibers and filaments of linear thermoplastic polyesters. This patent points out that the halogenated oligomeric styrene may be either chlorinated or brominated, and the degree of halogenation may run the complete spectrum.

U.S. Pat. No. 4,352,909 describes the preparation of tribrominated polystyrene polymers. Said process employs bromine chloride as the brominating agent and thus, typically from 1 to 2 weight percent of the product is chlorine.

U.S. Pat. No. 4,200,703 discloses a process for the manufacture of heat-stable, nuclear brominated polystyrene. The process involves brominating in bromine chloride or bromine, at a temperature of from −20° C. to 40° C., a polystyrene dissolved in a chlorinated hydrocarbon in the presence of a Lewis acid catalyst and from 0.02 to 2 moles, per mole of Lewis acid catalyst, of a nucleophilic substance which acts as a Lewis base, such as water, for the Lewis acid. The process is capable of making high molecular weight products without subjecting the polystyrene starting material to hydrogenation. The products are generally free of cross-linking. However, the color of the solid products ranges from ochre-colored to pale beige to "white" to pale yellow.

European Pat. App. No. 0 201 411 discloses a brominated polystyrene similar to that of U.S. Pat. No. 4,200,703 wherein the polystyrene is anionically polymerized and has a degree of polymerization greater than 400.

When brominated polystyrene is employed as a flame retardant additive in thermoplastics, its color is a property of primary importance to the manufacturer of the thermoplastic materials. The thermoplastic manufacturer desires to produce the thermoplastic articles in a wide range of colors. The more highly colored an additive, the more difficult it becomes to match (produce) a broad range of colors. The more lightly colored the additive, the easier it becomes to produce a wide range of colors. Therefore, in view of the needs of the manufacturer of thermoplastic parts, and in view of the inadequacy of prior art processes to produce a brominated polystyrene having the desired light color characteristics, a need exists for a brominated polystyrene with an improved light appearance as manufactured so that the end user can formulate a wide range of colors and thereby better meet the needs and demands of the marketplace.

SUMMARY OF INVENTION

It is therefore, an object of the present invention to provide a brominated polystyrene having improved color characteristics.

It is another object of the present invention to provide a process which allows the operator to select various reaction components and reaction parameters to obtain brominated polystyrenes having the best color characteristics for the choices made among the variables.

It is another object of the present invention to identify the various reactants and reaction parameters that influence the color characteristics obtainable in the bromination of polystyrenes.

At least one or more of the foregoing objectives, together with the advantages thereof over existing prior art forms, which shall become apparent from the specification which follows, are accomplished by the invention as hereinafter described and claimed.

In general, a process for the preparation of brominated polystyrene, as an additive for polymer matrices to impart flame retardancy, includes preparing a solution of a polystyrene reactant comprising from about five to about 20 percent by weight of a polystyrene reactant, in a halogenated hydrocarbon solvent; gradually adding a Lewis acid bromination catalyst to form a solution; adding to the solution from about 1 to about 3.3 moles of a brominating agent, per mole of polystyrene reactant repeating units, and reacting the polystyrene reactant with the brominating agent at a reaction temperature of from about −20° C. to about 50° C.; wherein the improvement comprises controlling the color characteristics of the resultant brominated polystyrene reactant by selecting a polystyrene reactant having a weight average molecular weight of from about 500 to about 1,500,000; selecting a catalytically effective amount of the catalyst on the basis of having a strength sufficient to effect bromination of the polystyrene reactant without inducing alkylation of the polystyrene reactant by the halogenated hydrocarbon solvent; selecting a brominating agent from the group consisting of bromine chloride and bromine; operating at the lowest possible temperature within the range, consistent with the brominating agent and the catalyst selected; and isolating the brominated polystyrene reactant, wherein the color properties of the resultant brominated product are improved by selection and consideration of reaction time and temperature, catalyst, brominating agent and method of product isolation.

PREFERRED EMBODIMENT FOR CARRYING OUT THE INVENTION

One preferred embodiment of the process of the present invention may be represented by the following equation:

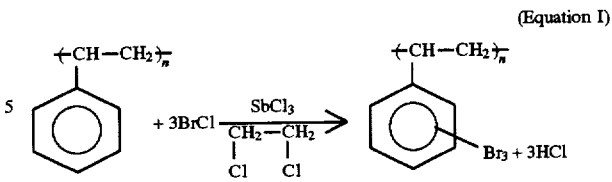

(Equation I)

As Equation I indicates, the reaction in this embodiment of the invention is generally conducted in a solvent, preferably a chlorinated hydro carbon solvent. Preferred solvents include halogenated hydrocarbons such as carbon tetrachloride, chloroform, methylene chloride, 1,2-dichloroethane, 1,2-dibromoethane, 1,1,2-trichloroethane, 1,1,2,2-tetrachloroethane and the like. The preferred solvent is EDC (1,2-dichloroethane). Mixtures of solvents can also be employed.

The polystyrene reactant is first dissolved in a solvent to form a solution having a concentration of about five to about 20 percent by weight. The catalyst is then added followed by the gradual addition of the brominating agent and the resulting mixture is allowed to react with effective temperature control.

The brominating agent is selected from the group consisting of bromine chloride, elemental bromine or a mixture of both. Pure bromine chloride is about 70 percent by weight bromine. For practical reasons bromine chloride having a total bromine content of from about 65 to about 75 percent by weight is employed. While the brominating agent is preferably added neat, the process can be employed utilizing a solution of the brominating agent in a halogenated hydrocarbon solvent, the same as the solvent for polystyrene or a different solvent, compatible therewith. From about 2.8 moles to about 3.3 moles of the brominating agent are added per mole of polystyrene in order to obtain up to three bromines per polystyrene repeating unit. More generally, the amount of brominating agent is determined by the amount of bromination that is desired in the polystyrene product and thus, to achieve between one and three bromines per repeating polystyrene unit, from one to about 3.3 moles of brominating agent are employed, the latter amount being slightly in excess of 3 moles in order to ensure complete bromination. Relative amounts of bromine chloride and bromine in a mixture are not a limitation of the present invention and are determined somewhat with respect to the bromination catalyst, as will be explained hereinbelow.

The catalyst is a weak Lewis acid halogenation catalyst, preferably antimony trichloride or antimony tribromide. By "weak" it is understood to mean that the catalyst is incapable of catalyzing a Friedel-Crafts alkylation reaction or, in this specific system, the reaction of a halogenated hydrocarbon with an aromatic substrate such as polystyrene. In the case of a polyhalogenated solvent such a reaction would result in an undesirable crosslinking reaction.

A catalytically effective amount of the weak Lewis acid catalyst must be employed. Catalyst levels in the range of from about 0.2 percent to about 10 percent by weight are desired. The exact amount of catalyst will depend on its activity. For antimony trichloride, and using bromine chloride as the brominating agent, catalyst levels lower than about 5 percent by weight in laboratory experiments may result in slower reaction rates and the production of an underbrominated product, unless a larger excess of bromine chloride is employed. While the reaction is technically feasible with very small amounts of catalyst and very large amounts of brominating agent over that theoretically required, or at the other end of the scale, with large amounts of catalyst and very little excess of brominating agent over that theoretically required, the overriding factor in determining amount of catalyst is the strength of the Lewis acid. In other words, for stronger Lewis acid catalysts, lower amounts are employed while for weaker Lewis acids greater amounts are employed.

Catalyst mixtures are also possible which further allows control over the strength of the Lewis acid catalyst employed in the process. Such mixtures include not only two or more Lewis acids but also mixtures with one of more Lewis bases, such as but not limited to water, alcohols, ethers, esters, carboxylic acids, acid chlorides, ketones, aldehydes, amines, nitriles and the like. For a more complete discussion of various Lewis bases and acids, see U.S. Pat. No. 4,200,703, the subject matter of which is incorporated herein by reference. Selection of the brominating catalyst or catalyst mixture is also a function of the particular brominating agent employed. As will be appreciated by those skilled in the art, bromine chloride, for instance, is a more reactive brominating agent and it is therefore possible to achieve higher levels of bromination with weaker catalysts. Where bromine is employed, it is necessary to employ more active catalysts in order to achieve the higher levels of aromatic bromination. Where the brominating agent is a mixture of bromine chloride and bromine, any relative amounts of the two can be balanced against the catalyst selected and vice-versa, as will be appreciated by those skilled in the art.

The reaction between the brominating agent and the polystyrene reactant can be carried at any temperature within the range of from about −20° C. to about 50° C. Generally, the lower end of the temperature range is preferred in order to obtain the best color. However, at lower temperatures, the rate of reaction is slowed and in fact, may not be a rate that is commercially acceptable. Consequently, it may be necessary to compromise with regard to temperature in order to achieve a reaction rate that is commercially acceptable. In the laboratory work reported hereinbelow, a five hour reaction rate was deemed to be satisfactory. We have also observed that the reaction rate is influenced by the brominating agent selected and by the catalyst selected.

The polystyrene reactant that is employed may be either an oligomer or a polymer. Accordingly, the initial molecular weight of the polystyrene is from about 500 $\overline{Mw}$ to about 1,500,000 $\overline{Mw}$ and preferably from about 500 $\overline{Mw}$ to about 500,000 $\overline{Mw}$. The process is also effective for the bromination of substituted polystyrene, the substitution being nuclear. Obviously, nuclear substituents will affect the position(s) at which the bromination occurs and the amount of additional bromination that takes place. Examples of the substituted polystyrenes that may be brominated in accordance with the process of the invention include halogenated and alkylated polymers such as poly-(bromo- styrene), poly-(chlorostyrene), poly-(dichlorostyrene), poly-(dibromostyrene), poly-(chloro-bromo-styrene), poly-(4-methyl styrene) and poly-(mono-lower alkyl styrene). Halogen substituents include chlorine and bromine and alkyl substituents include lower alkyl group having from one to about four carbon atoms. Accordingly, the term polystyrene reactant, or just polystyrene, as used throughout the specification and claims, shall refer to the foregoing homopolystyrene and oligomers as well as substituted polystyrenes within the scope of this invention.

The reaction is carried out to introduce up to three bromine atoms on each aromatic nucleus. Hydrogen chloride or hydrogen bromide is produced as a byproduct of the reaction, depending upon whether bromine chloride or bromine is used.

While the invention can be employed, as indicated in Equation I above, for the production of what is essentially tribrominated polystyrene, the process of the invention is of general utility for the production of brominated polystyrene products having any desired degree of bromination up to three.

Prior art bromination techniques, applied to styrene polymers or oligomers, are currently less effective than the present process in producing a suitably light colored material. Products can be produced by the preferred process of the invention at any desired level of bromination with very good color characteristics, i.e., very light in color, so that the highly brominated products are desirable flame retardant additives for the plastics industry. Products having a lower degree of bromination than essentially tribromination are also useful as flame retardant additives.

In order to carry out the reaction of the invention in accordance with the more preferred embodiments thereof, the polystyrene reactant should be selected to have a weight average molecular weight of about 500 or more, and preferably, 150,000 or higher, up to about 1,500,000. The polystyrene reactant is dissolved in ethylene dichloride, or other suitable solvent as discussed above, in a reaction vessel that is equipped with mechanical agitation. The catalyst is added to the polystyrene solution. The brominating agent is then added to the reactor gradually, over a period of time that generally amounts to several hours, in order to react within a reasonable time as discussed hereinabove.

During this addition, the temperature of the solution in the reactor is maintained within a controlled range, generally from about −20° C. to about 50° C. The reaction goes forward at lower temperatures but at a slower rate. It also goes forward at higher temperatures, but as the temperature increases, the color of the product will deteriorate. The reaction is exothermic, so that cooling is employed. Where color of the product is an important consideration, as it often is, particularly with respect to a tribrominated polystyrene product, it is considered essential to maintain effective control of the temperature of the reaction mixture. When the brominating agent addition is complete, the reaction mixture is stirred for another period of time, sufficient to permit the reaction to go to completion.

While reaction times are based in part upon the reaction temperature, such times can vary greatly between about one and 20 hours. Where the catalyst of preference is relatively strong or reactive, reaction temperatures or times or both can be decreased. In an instance where the reaction cannot be sufficiently cooled to lower ranges, control over the color characteristics of the polystyrene additive can be accomplished by decreasing the reaction time. It is to be appreciated that the objective is providing the best color possible and accordingly, within the spirit of the invention, reaction time and temperature will be determined and selected with consideration of the brominating catalyst, the brominating agent and, the method of precipitation. It will be also appreciated that greater or lesser periods of time are not necessarily precluded, the range being expressed primarily satisfies most commercially acceptable periods.

After the reaction is considered to be complete, any excess brominating agent is destroyed, as by the addition of a reducing agent such as an aqueous solution of an alkali metal bisulfite. Agitation of the reaction mixture is then stopped, and phase separation occurs.

Product recovery can be accomplished by any recognized and acceptable method, such as for instance, by water flashing or non-solvent precipitation. In the latter method, the non-solvent that is miscible with the organic liquid in which the reaction product is dissolved, is maintained in a separate vessel at ambient temperature. Suitable non-solvent liquids include alkanols and preferably methanol or a ketone, such as acetone, to precipitate the product. The contents of the reaction vessel are slowly added to the non-solvent as it is agitated. Under the proper conditions, the brominated polymer precipitates in the form of fine particles, which can be recovered by filtration and dried. In the water flashing method, the solution of product is gradually added to boiling water, causing the solvent to flash off, and leaving the product as a slurry in water. The product is then conventionally recovered.

Nevertheless, the method of product isolation is also a factor in controlling the color properties of the brominated product. Investigations reported herein support non-solvent precipitation over water flashing as another means of obtaining better color.

An essentially tribrominated product is one where the bromine content is at least 66 percent. The process of the invention is such, however, that when the brominating agent is bromine chloride, some nuclear chlorination always takes place in addition to nuclear bromination. Accordingly, generally, in such cases the bromine content of the product is in the range of from about 66 percent by weight to about 69 percent by weight of the product, and the chlorine content is typically about 0.5 to 1 percent by weight of the product, but may go as high as up to about 2 percent by weight of the product.

A typical tribrominated polystyrene product produced by the practice of the preferred process may be found, upon analysis, to contain about 66 percent to about 69 percent by weight of bromine, about 0.5 percent to 2 percent by weight of chlorine, and generally, from about 0.2 percent to 0.5 percent by weight of volatiles. If the yield of the reaction is calculated, based upon three bromine atoms being substituted on each aromatic ring nucleus, the process of the invention typically produces a yield of about at least 90 percent or higher.

In practicing the preferred process, particularly on an industrial scale, many departures from the foregoing general process description can be made, within the scope of the invention. For example, commercially available bromine chloride can be added directly to the reactor, or a bromine chloride solution can be employed. Usually some excess of bromine chloride must be used, but the amount in excess depends upon the reaction conditions, such as, for example, moisture content in the solvent, selection of catalyst, the reaction temperature, and the like.

The organic solvent that is selected as the reaction medium should dissolve the reactants and be inert or of very low reactivity toward them. Especially suitable are those halogenated, particularly chlorinated, aliphatic hydrocarbons that are saturated. Carbon saturation in the solvent is needed primarily to avoid halogen addition. Suitable solvents, as noted above, include carbon tetrachloride, chloroform, 1,1,2,2-tetrachloroethane, methylene chloride, 1,2-dichloroethane, 1,1,2-trichloroethane, 1,2-dibromoethane, and the like with EDC (1,2-dichloroethane) being preferred. If methylene chloride is employed, the proper equipment should be employed to contain it because it tends to escape due to its low boiling point and high volatility.

When using a weak Lewis acid catalyst, which is a single entity, the solvent should be substantially anhydrous, since water may destroy or deactivate the catalyst. Ordinarily, commercial grades of solvent are used. Generally, the manufacturer specifies a maximum moisture level and for present purposes, the use of commercial solvents has been found to be satisfactory. However, it is a wise precaution to ascertain the moisture level and if possible azeotrope the solvent to dry it. The small amount of moisture normally present in commercially available halogenated hydrocarbon solvents does moderate the activity of the catalyst, however, so that in some cases, more or less catalyst may be required for a given result, depending upon the total amount of moisture present.

Any brominated polystyrene product has inherent flame retardant properties. For use as a flame retardant additive to a host polymer, it is usually desirable to use the smallest feasible amount of the additive. For this reason, generally, it is preferred to produce and use as a flame retardant additive polystyrene with higher bromine content. In the industry, it is common to adjust the amount of brominated additive employed in the plastic composition to attain a particular degree of resistance to ignition. In general, the higher the bromine content of a particular additive, the more efficient it is and the less of that additive is required. The smaller the amount of additive employed, generally speaking, the better the economics. While in some cases the use of a flame retardant may enhance certain physical properties of the overall composition, more generally, the use of an additive tends to degrade desirable physical characteristics and for this reason also, lesser amounts of additives are preferred when equivalent results can be attained.

While these considerations should seem to indicate that complete bromination would be desirable, it is not practical in this particular case. As repeated demonstrations of the invention have indicated, when the point of trihalogenation is reached in ethylene dichloride used as a solvent, the halogenated polystyrene starts to form a separate phase. This change does not relate to cross-linking but rather to a change in solubility in the particular solvent that is being used. This phase separation makes it difficult to process the product and recover it. For this reason, the preferred process of the invention is ordinarily practiced to produce a trihalogenated polystyrene product, that is, an essentially tribrominated polystyrene product.

GENERAL EXPERIMENTAL

The invention will now be further described in detail by descriptions of specific demonstrations thereof. In the following examples and throughout this application, all parts and percentages are by weight and all temperatures are expressed in degrees Celsius, unless expressly stated to be otherwise. The EDC solvent employed was dried to less than 100 ppm moisture by azeotropic distillation or dried over molecular sieves.

EXPERIMENTAL PROCEDURE

Into a 1 L resin flask equipped with a mechanical stirrer, thermometer, spiral condenser, and a 500 mL jacketed pressure equalized addition funnel was placed 50.1 g (0.481 mole based upon styrene repeating units) of polystyrene and 350 mL of 1,2-dichloroethane (EDC). To the stirred solution was added 2.5 g (0.01096 mole) antimony trichloride (added as a solution in EDC —0.2 g/mL) and the solution was cooled to 20° C. A bromine chloride solution composed of 187.5 g (1.625 mole) bromine chloride, 2.7 g (0.0169 mole) bromine and 187.5 g EDC was added continuously to the polystyrene solution over 3 hours while maintaining the bromination temperature at 20° C +±2° C. The system was typically stirred for approximately two more hours in order to achieve a bromine content in the final product of 66 percent minimum (total bromination time was 5 hours).

Aqueous sodium bisulfite 180 g (20 percent by weight) was added at such a rate as to not exceed 35° C. A weight of deionized water equal to the weight of the aqueous sodium bisulfite used was added to the mixture. The mixture was stirred for an additional 10–15 minutes and then transferred to a 2 L separator funnel.

The organic layer was removed and washed three times with 1 L fresh deionized water. During the third wash, the pH of the aqueous layer was adjusted to approximately seven by the incremental addition of approximately 60 g of saturated aqueous sodium bicarbonate solution. After the third wash, the organic phase was placed in an appropriately sized additional funnel. This was added to a 3 L Morton resin flask equipped with a mechanical stirrer, distillation head, condenser, receiver, and heating mantle. The flask also contained 2 L boiling deionized water which was being vigorously agitated. During the addition of the solution to the boiling water, the EDC flashed off as a EDC/water azeotrope.

The temperature during this operation was maintained between 91° C. and 100° C. When the addition of the solution was completed, the resulting slurry was held at approximately 100° C. for an additional hour.

The product was collected by filtration, washed on the filter with 4 L hot deionized water and then 4 L cold deionized water. The product was vacuum dried at 100° C. at 5 –10 torr for 48 hours. The yield of product was around 138 –148 g.

A number of polystyrene brominations similar to the general procedure were conducted at 40° C., 20° C. and 0° C. in order to demonstrate the color properties thereof versus reaction temperature. Color was determined using two different methods. The first, was ASTM D1544-68 Method, also referred to as the Gardner Color Scale Method. The second was Total Color Difference ($\Delta E$), using the Hunter L, a, b scales, for product solutions in chlorobenzene, 10 percent by weight concentration versus chlorobenzene, according to the formula:

$$\Delta E = \sqrt{(\Delta L)^2 + (\Delta a_L)^2 + (\Delta b_L)^2}$$

Results are reported in TABLE I.

TABLE I

COLOR VERSUS REACTION TEMPERATURE

| Ex. No. | | Reaction Temp. °C. | Gardner Color | $\Delta E$ |
|---|---|---|---|---|
| 1 | Series I[a] | 40 | 3 | 28.6 |
| 2 | | 20 | 1 | 16.9 |
| 3 | | 0 | <1 | 6.9 |
| 4 | Series II[b] | 40 | 3 | 30.0 |
| 5 | | 20 | 1 | 17.1 |
| 6 | | 0 | <1 | 8.9 |
| 7 | Series III[a] | 40 | 3 | 30.6 |
| 8 | | 20 | 1 | 14.9 |
| 9 | | 0 | <1 | 8.2 |

[a]Using Chevron EA3000 polystyrene, 300,000 $\overline{M}w$
[b]Using Polysar HH101-300 polystyrene, 270,000 $\overline{M}w$ As shown in TABLE I, the more desirable lower $\Delta E$ numbers and the better Gardner colors were obtained at lower temperatures.

Another color versus reaction temperature series of experiments was conducted using a lower molecular weight polystyrene than those employed for the data reported in Table 1. The polystyrene was Hercules Res M1187, known to have a weight average molecular weight of about 900. The results are reported in TABLE II.

TABLE II

COLOR VERSUS REACTION TEMPERATURE

| Ex. No. | Bromination Temperature °C. | $\Delta E$ |
|---|---|---|
| 1 | 20 | 50.2 to 51.0 |
| 2 | 0 | 30.2 |
| 3 | –10 | 25.5 to 27.4 |

In order to demonstrate the relationship between bromination time and final product color, in a bromination that is otherwise similar to the general procedure, but conducted at 35° C., three experiments were conducted at varying times. The polystyrene utilized was Chevron EA 3000, 300,000 $\overline{M}w$, dissolved in EDC to form approximately a 9.1 percent by weight solution and utilizing antimony trichloride as the catalyst. Total Color Difference ($\Delta E$) for product solutions in chlorobenzene, 10 percent by weight concentration was measured. Results are reported in Table III.

TABLE III

COLOR OF BROMINATED POLYSTYRENE VERSUS BROMINATION TIME

| Ex. No. | Total Bromination Time (hrs) | Bromination Temp °C. | $\Delta E$ |
|---|---|---|---|
| 1 | 4 | 35 | 20.75 |
| 2 | 7 | 35 | 25.15 |
| 3 | 10 | 35 | 30.36 |

The data in Table III establishes the relationship between bromination time and final product color at 35° C. In general, the better colors, lower $\Delta E$, are a result of the shorter bromination times.

In the next series of work, comparisons were made among three different catalysts, the two brominating agents and three different temperatures for the bromination of polystyrene, utilizing Chevron AE 3000, 300,000 $\overline{M}w$, dissolved in EDC to form approximately a 10.25 percent by weight solution. The amount of the respective catalysts in polystyrene (weight percent) was 5% for Examples No. 1–6; 3.88% for Examples No. 7–12; and, 4.68% for Examples No. 13–18. Color properties were measured and have been reported, with the components reacted and reaction data, in Table IV hereinbelow.

TABLE IV

COLOR PROPERTIES AS A RESULT OF PROCESS VARIABLES

| EX. NO. | CATALYST | BR AGENT | BR TEMP °C. | REACTION TIME HR | % BR | SOLID ΔE | SOLUTION ΔE |
|---|---|---|---|---|---|---|---|
| 1 | $SbCl_3$ | BrCl | 0 | 5.03 | 64.51 | | 7.66 |
| 2 | $SbCl_3$ | BrCl | 20 | 5.25 | 66.59 | | 14.45 |
| 3 | $SbCl_3$ | BrCl | 40 | 4.18 | 68.74 | | 24.15 |
| 4 | $SbCl_3$ | $Br_2$ | 0 | 5.00 | 42.36 | | 11.16 |
| 5 | $SbCl_3$ | $Br_2$ | 20 | 5.00 | 42.81 | | 18.02 |
| 6 | $SbCl_3$ | $Br_2$ | 40 | 5.00 | 42.39 | | 32.41 |
| 7 | $AlCl_3$ | BrCl | 0 | 3.18 | 66.99 | 10.69 | |
| 8 | $AlCl_3$ | BrCl | 20 | 3.17 | 66.62 | 13.38 | |
| 9 | $AlCl_3$ | BrCl | 40 | 3.00 | 68.56 | 29.69 | |
| 10 | $AlCl_3$ | $Br_2$ | 0 | 3.48 | 67.34 | | 22.45 |
| 11 | $AlCl_3$ | $Br_2$ | 20 | 3.82 | 67.38 | | 49.29 |
| 12 | $AlCl_3$ | $Br_2$ | 40 | 3.95 | 68.03 | | 82.50 |
| 13 | $FeCl_3$ | BrCl | 0 | 3.20 | 65.46 | 10.38 | |
| 14 | $FeCl_3$ | BrCl | 20 | 3.10 | 67.09 | 15.07 | |
| 15 | $FeCl_3$ | BrCl | 40 | 3.48 | 68.40 | 15.41* | |
| 16 | $FeCl_3$ | $Br_2$ | 0 | 5.55 | 66.90 | | 37.14 |
| 17 | $FeCl_3$ | $Br_2$ | 20 | 4.07 | 67.81 | | 52.79 |
| 18 | $FeCl_3$ | $Br_2$ | 40 | 3.67 | 67.91 | | 70.47 |

*Color difference noted visually, but instrumentation could not differentiate

As can be seen from the foregoing data in Table IV, the best color was produced, in an overall sense, at the lower range of reaction temperature; using bromine chloride as the brominating agent and with antimony trichloride as the catalyst. Nevertheless, the benefits of the process of the invention are equally demonstrated by the data. Considering, for instance, if the brominating agent available or desired in a given situation is bromine, by lowering the reaction temperature to 0° C., (Ex. No. 4) a better color resulted than where bromine chloride was reacted at 20° C. (Ex. No. 2), in both instances, using antimony trichloride as the catalyst. As another instance, where the reaction temperature cannot be lowered as readily, employing bromine chloride as the brominating agent produces a better color than using bromine (Ex. No. 6 vs. Ex. No. 3). As another instance, while ferric chloride may not provide the best results as a catalyst, by lowering the reaction temperature and selecting bromine chloride as the brominating agent, the better color values can be obtained (Ex. Nos. 13–15 ). In fact, comparing the solution ΔE values, one can see that selection of ferric chloride, bromine and 0° C. could provide color comparable to the use of antimony trichloride and bromine at 40° C. and thus, it should be apparent that one or more process parameters can be varied to accommodate a specific process parameter.

In the final series of work, comparisons were made to demonstrate the combined effects of reaction temperature and isolation procedure on color. The brominations and two methods of product isolation were conducted as follows. The polystyrene selected was DOW XP 6065, 200,000 $\overline{M}w$. All color deter minations were run as a 4% solution in chlorobenzene on a Gardner XL-20 Tristimulus Colorimeter from Pacific Scientific using Illuminant "C."

Into a 1 L resin flask equipped with a heating mantle with a controller, mechanical stirrer, thermometer, distillation head with a vertical sidearm take-off tube (Lab Glass LG-1 781 T), spiral condenser, and a 500 mL jacketed pressure equalized addition funnel was placed 50.1 g (0.481 mole based upon styrene repeating units) of polystyrene and 600 mL of 1,2 dichloroethane (EDC). With stirring the solution was heated to reflux and 60 mL of EDC/$H_2O$ was removed in order to remove water from the system as an azeotrope. The solution was cooled to 20° C. and 12.5mL of a solution of antimony trichloride in EDC (0.2 g/mL) was added. A bromine chloride solution composed of 187.5 g (1.62.5 mole) bromine chloride, 2.7 g (0.0169 mole) bromine and 187.5g EDC was added continuously to the polystyrene solution over 3 hours while maintaining the bromination temperature at 20° C.±2° C. The system was typically stirred for approximately two more hours in order to achieve a bromine content in the final product of 66 percent minimum (total bromination time was 5.0 hours).

Aqueous sodium hydroxide 100 mL (25 percent by weight) was added at such a rate as not to exceed 35° C. The mixture was stirred for an additional 10–15 minutes and then transferred to a 2 L separatory funnel.

The organic layer was removed and washed two times with 700 mL fresh deionized water. After the second wash, the 700 mL of organic phase was split in half.

PRODUCT ISOLATION BY FLASHING THE SOLVENT OFF IN BOILING WATER

One half of the organic phase was diluted with 200 mL of EDC and was placed in an appropriately sized addition funnel. This was added to 1.2 L of vigorously agitated boiling deionized water contained in a 2 L Morton resin flask equipped with a mechanical stirrer, distillation head, condenser, receiver, and heating mantle. During the addition of the organic solution to the boiling water, the EDC flashed off as a mixture of EDC and water and a slurry resulted in the flask.

The temperature during this operation was maintained between 91 ° C. and 100° C. When the addition of the solution was completed, the resulting slurry was held at approximately 100° C for an additional hour.

The product was collected by filtration, washed on the filter with 2 L hot deionized water and then 2 L ambient temperature deionized water. The product was vacuum dried (water aspirator) at 60° C. for 12 hours and then to a constant weight at 120° C. under vacuum (5–10 torr). The yield of product was around 65–75 grams.

PRODUCT ISOLATION BY PRECIPITATING THE POLYMER SOLUTION IN A NON-SOLVENT

The other half of the organic phase was diluted with 200 mL of EDC and was placed in an appropriately sized addition funnel. This was added to 1.2 L methanol contained in a 4 L Morton resin flask equipped with a mechanical stirrer. The precipitation was conducted at room temperature with a two and one half hour addition followed by an additional 15 minutes of stirring.

The product was collected by filtration, reslurried in methanol for 30 minutes and collected again by filtration. The product was vacuum dried (water aspirator) at 60° C. to a constant weight in 12 hours. The yield of product was around 65–75 grams. Whiteness index (WI) and yellowness index (YI) were determined according to ASTM E1313-73. Results are reported in TABLE V hereinbelow. The formulae for WI and YI are as follows:

$$WI = 0.1 \, L \, (L - 5.7b)$$

The higher the Whiteness Index (WI), the whiter the color of the sample.

$$YI = \frac{100 \, (0.72a + 1.79b)}{L}$$

The lower the Yellowness Index (YI), the more the sample approaches being white.

TABLE V

COLOR VERSUS REACTION TEMP AND ISOLATION PROCEDURE

| Ex. No. | BrT °C. | WI | YI |
|---|---|---|---|
| 1 | MP[a] | 20 | 42.3 | 15.4 |
| 2 | W[b] | 20 | 37.4 | 17.2 |
| 3 | MP | 35 | 12.3 | 25.6 |
| 4 | W | 35 | 3.3 | 28.2 |

[a]MP means the sample was precipitated in methanol.
[b]W means the sample was isolated from boiling water.

The data in Table V clearly shows two trends. First, the color of the brominated polystyrene was better when the bromination was conducted at lower temperatures holding all other variables constant. Second, the color was better (whiter) when the brominated polystyrene was isolated by a non-solvent precipitation (methanol) rather than flashing off the solvent in boiling water. Similar conclusions can be drawn by extrapolation from the data in the foregoing Tables.

Thus it should be evident that the process of the present invention is highly effective in preparing a brominated polystyrene having improved color characteristics.

Based upon the foregoing disclosure, it should now be apparent that the use of the process described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the brominating agent, catalysts and reaction temperatures and times and other reaction conditions according to the present invention are not necessarily limited to those discussed herein. Thus, the scope of the invention shall include all modifications and variations that may fall within the scope of the attached claims.

What is claimed is:

1. In a process for the preparation of brominated polystyrene, as an additive for polymer matrices to impart flame retardancy, including
    preparing a solution of a polystyrene reactant comprising from about five to about 20 percent by weight of said polystyrene reactant, in a halogenated hydrocarbon solvent;
    adding a weak Lewis acid bromination catalyst in an amount of from about 0.2 to 10 percent by weight, to form a solution, said catalyst having a strength sufficient to effect bromination of said polystyrene reactant without inducing alkylation of said polystyrene reactant by said halogenated hydrocarbon solvent;
    adding to said solution from about 1 to about 3.3 moles of a brominating agent, per mole of polystyrene repeating units; and
    reacting said polystyrene with said brominating agent at a temperature of from about −20° C. to about 30 ° C.;
    wherein the improvement comprises:
    controlling the color characteristics of the resultant brominated polystyrene product by
    selecting said polystyrene reactant having a weight average molecular weight of from about 500 to about 1,500,000;
    selecting a brominating agent from the group consisting of bromine chloride and bromine;
    operating at the lowest possible temperature within said range, consistent with said brominating agent and the catalyst selected; and
    adding the contents of the reaction vessel to boiling water with agitation and flashing off said solvent while producing a slurry; and
    recovering said brominated polymer from said slurry,. wherein the color properties of the resultant brominated product are improved by selection and consideration of reaction time and temperature, catalyst, brominating agent and method of product isolation.

2. A process as in claim 1, wherein said hydrocarbon solvent is selected from the group consisting of carbon tetrachloride, chloroform, methylene chloride, 1,2-dichloroethane, 1,1,2-trichloroethane, 1,1,2,2-tetrachloroethane, 1,2-dibromoethane and mixtures thereof.

3. A process as in claim 1, further comprising the step of quenching said reaction with an aqueous solution of an alkali metal bisulfite.

4. A process as in claim 1, wherein said catalyst is selected from the group consisting of antimony trichloride and antimony tribromide and mixtures thereof.

5. A process as in claim 4, wherein said step of reacting is conducted for a period of time ranging from about one to 20 hours.

6. A process as in claim 5, wherein said catalyst is antimony trichloride; said brominating agent is bromine chloride; said reaction temperature is 0° C. and said reaction time is about five hours.

7. A process as in claim 5, wherein said catalyst is antimony tribromide; said brominating agent is bromine chloride; said reaction temperature is 0° C. and said reaction time is about five hours.

8. A process as in claim 5, wherein said catalyst is antimony trichloride; said brominating agent is bromine; said reaction temperature is 0° C. and said reaction time is about five hours.

9. A process as in claim 5, wherein said catalyst is antimony tribromide; said brominating agent is bromine; said reaction temperature is 0° C. and said reaction time is about five hours.

10. A process as in claim 1, wherein said polystyrene reactant is selected from the group consisting of homopolystyrene, polystyrene oligomers, halogenated polystyrenes and alkylated polystyrenes.

* * * * *